US008001405B2

(12) United States Patent
Dittmann et al.

(10) Patent No.: US 8,001,405 B2
(45) Date of Patent: Aug. 16, 2011

(54) SELF-TUNING POWER MANAGEMENT TECHNIQUES

(75) Inventors: Gero Dittmann, New York, NY (US); Reinaldo A. Bergamaschi, Tarrytown, NY (US); Indira Nair, Briarcliff Manor, NY (US); Alper Buyuktosunoglu, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 459 days.

(21) Appl. No.: 12/201,821

(22) Filed: Aug. 29, 2008

(65) Prior Publication Data

US 2010/0058084 A1    Mar. 4, 2010

(51) Int. Cl.
G06F 1/26 (2006.01)
G06F 1/00 (2006.01)
G06F 11/00 (2006.01)
G01R 21/00 (2006.01)

(52) U.S. Cl. ............ 713/320; 713/300; 702/60; 714/10; 714/47.1

(58) Field of Classification Search .................. 713/300, 713/320; 702/60; 714/10, 47.1
See application file for complete search history.

(56) References Cited

U.S. PATENT DOCUMENTS

| 6,047,248 | A | 4/2000 | Georgiou et al. |
| 6,574,740 | B1 * | 6/2003 | Odaohhara et al. ........... 713/323 |
| 6,647,501 | B1 * | 11/2003 | Ninomiya ..................... 713/320 |
| 7,051,306 | B2 | 5/2006 | Hoberman et al. |
| 7,093,147 | B2 | 8/2006 | Farkas et al. |
| 7,141,953 | B2 | 11/2006 | Cohen et al. |
| 7,155,617 | B2 | 12/2006 | Gary et al. |
| 7,174,467 | B1 | 2/2007 | Helms et al. |
| 7,219,245 | B1 | 5/2007 | Raghuvanshi |
| 7,337,335 | B2 | 2/2008 | Jorgenson et al. |
| 7,373,221 | B2 * | 5/2008 | Lal ................................ 700/291 |
| 7,543,108 | B2 * | 6/2009 | Kakihara et al. .............. 711/112 |
| 2006/0026447 | A1 | 2/2006 | Naveh et al. |
| 2006/0279152 | A1 | 12/2006 | Ha |
| 2006/0288243 | A1 | 12/2006 | Kim |

OTHER PUBLICATIONS

Wang et al., "Cluster-Level Feedback Power Control for Performance Optimization," HPCA 2008.
Wang et al., "Cluster-Level Feedback Power Control for Performance Optimization," IEEE (2008).
C. Isci et al., "An Analysis of Efficient Multi-Core Global Power Management Policies: Maximizing Performance for a Given Power Budget," Proceedings of the $39^{th}$ annual International Symposium on Microarchitecture (MICRO' 06), IEEE, pp. 347-358 (Dec. 9-13, 2006).
R. Bergamaschi et al., "Exploring Power Management in Multi-Core Systems," Proceedings of the $13^{th}$ Asia and South Pacific Design Automation Conference (ASP-DAC 2008), Seoul, Korea (Jan. 2008).

* cited by examiner

*Primary Examiner* — Stefan Stoynov
(74) *Attorney, Agent, or Firm* — Preston Young; Michael J. Chang, LLC

(57) ABSTRACT

Power management techniques include a method for power management of a processor chip which comprises the following steps. An initial operating level is set for the processor chip. After a predetermined time interval, slack is calculated. If the slack is greater than zero, the initial operating level is increased to a next higher level, otherwise the initial operating level is maintained. After the predetermined time interval, the slack is re-calculated and further includes accumulated slack. If the re-calculated slack is greater than zero, the operating level is increased to the next higher level if the processor chip is being operated at the initial operating level, otherwise the operating level is returned to the initial operating level if the processor chip is being operated at the next higher operating level. The steps to re-calculate the slack and either increase the operating level to the next higher level or return the operating level to the initial operating level are repeated.

15 Claims, 4 Drawing Sheets

200

300

SELF-TUNING POWER MANAGEMENT TECHNIQUES

STATEMENT OF GOVERNMENT RIGHTS

This invention was made with Government support under Contract number HR00110790002 awarded by (DARPA) Defense Advanced Research Projects Agency. The Government has certain rights in this invention.

FIELD OF THE INVENTION

The present invention relates to power management, and more particularly, to techniques for power management of a processor chip.

BACKGROUND OF THE INVENTION

Power management features are common in today's high-power computing devices to conserve power and are especially useful in devices, such as laptop computers, that run on batteries. One way to conserve power is to modulate processor activity, which is typically enabled through the use of power management actuators, such as dynamic frequency scaling (DFS) or combined frequency and voltage scaling (DVFS) actuators, that scale-down processor frequency and/or voltage at certain times or in certain modes. By temporarily reducing processor activity, heat produced by the device is also reduced, thereby further conserving power needed for cooling.

Power management actuators typically can only adjust the voltage and/or frequency in set increments (or levels). As such, with conventional power management techniques that use power management actuators, such as MaxBIPS, the voltage is adjusted to the highest level at which power consumption by the processor approximates, but does not exceed, a particular power budget. See, for example, C. Isci et al., "An Analysis of Efficient Multi-Core Global Power Management Policies: Maximizing Performance for a Given Power Budget," Proceedings of the 39th annual International Symposium on Microarchitecture (MICRO' 06), IEEE, pp. 347-358 (Dec. 9-13, 2006) (hereinafter "Isci"), the disclosure of which is incorporated by reference herein. For example, as described in Isci, MaxBIPS predicts power and billion instructions per second (BIPS) values for different combinations of power (voltage (Vdd)/frequency (f)) modes, i.e., full-throttle execution (Vdd, f), medium power savings (95% Vdd, 95% f) and high power savings (85% Vdd, 85% f), and chooses the combination with the highest throughput that meets a power budget. This however, can leave a large margin between the power budget and actual consumed power, in particular, if the power budget is just below the power that the processor would consume at the next higher voltage level (see, for example, FIG. 1, described below). Thus, in many instances the processor is operated at a sub-optimal power level so as not to exceed the power budget. As a result, processor performance suffers.

FIG. 1 is graph 100 illustrating suboptimal power allocation for a processor chip from use of conventional power management techniques. In graph 100, relative power is plotted over time. The term "relative power" refers to a percentage of a maximum power consumption by the processor core. In the example illustrated in graph 100, voltage and frequency (both of which can contribute to power consumption) can be controlled in three voltage/frequency pairs or levels. The given power budget is 80 percent (%) of maximum available power. As can be seen from graph 100, more than 10% of the maximum available power is foregone at the voltage level closest to the power budget. This suboptimal use of available power also translates to suboptimal processor performance, since the lower voltage correlates to operation at a lower frequency.

Therefore, processor chip power management techniques that further improve processor performance under a given power budget would be desirable.

SUMMARY OF THE INVENTION

The present invention provides power management techniques. In one aspect of the invention, a method for power management of a processor chip is provided. The method comprises the following steps. At an initial time point $t_i$, an initial operating level is set for the processor chip such that the processor chip, when operated at the initial operating level, will have an actual power consumption that is as high as possible without exceeding a desired power consumption for the processor chip. After a predetermined time interval, power consumption slack is calculated as a difference between the desired processor chip power consumption and an average of the actual processor chip power consumption from the time point $t_i$. If the slack is greater than zero, the initial operating level is increased to a next higher level thereby increasing the actual processor chip power consumption, otherwise if the slack is less than zero, the initial operating level is maintained. After the predetermined time interval, the slack is re-calculated, wherein the re-calculated slack further includes slack, if any, that has accumulated during one or more previous intervals added thereto. If the re-calculated slack is greater than zero, the operating level is increased to the next higher level if the processor chip is being operated at the initial operating level, otherwise if the re-calculated slack is less than zero, the operating level is returned to the initial operating level if the processor chip is being operated at the next higher operating level. The steps to re-calculate the slack and either increase the operating level to the next higher level or return the operating level to the initial operating level are repeated.

A more complete understanding of the present invention, as well as further features and advantages of the present invention, will be obtained by reference to the following detailed description and drawings.

DETAILED DESCRIPTION OF PREFERRED EMBODIMENTS

Figure 1:
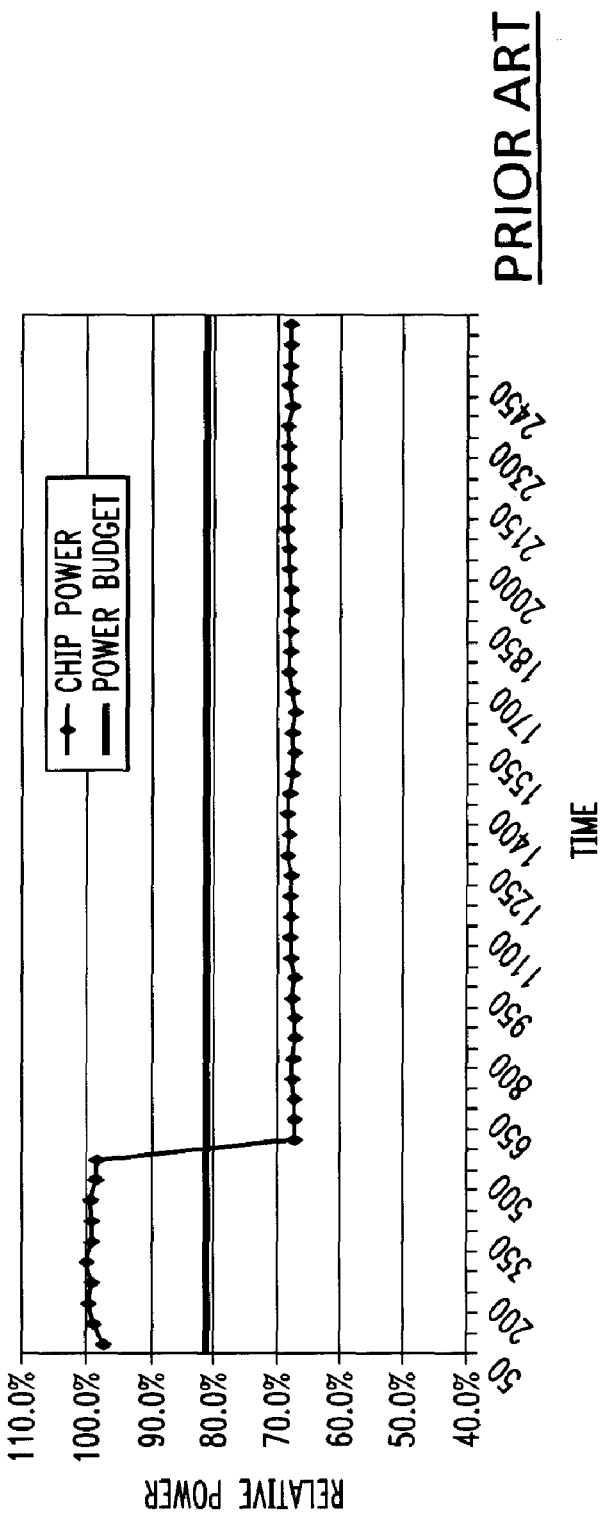
FIG. 1 is a graph illustrating suboptimal power allocation for a processor chip from use of conventional power management techniques.
Figure 2:
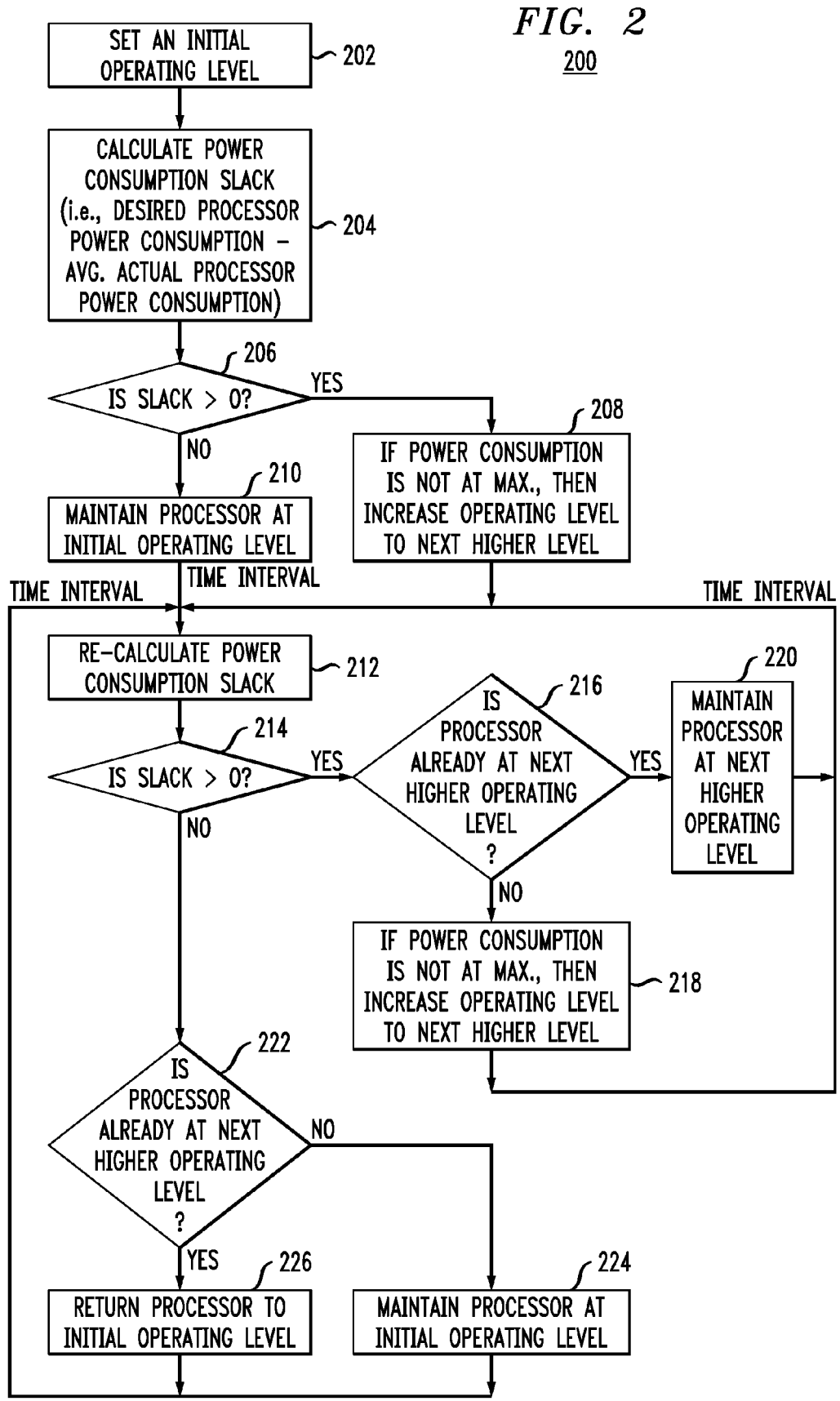
FIG. 2 is a diagram illustrating an exemplary methodology for processor chip power management according to an embodiment of the present invention.

FIG. 2 is a diagram illustrating exemplary methodology 200 for processor chip power management. The processor chip can be a single core processor chip or a multi-core processor chip. As will be described in detail below, methodology 200 can be implemented using standard power management actuators, such as dynamic frequency scaling (DFS) and/or combined frequency and voltage scaling (DVFS) actuators, to adjust operating levels (see below). In general, power management actuators are typically only adjustable in discrete increments (from one operating level to the next), e.g., in increments of 0.1 volts (V) in the case of DVFS actuators. Thus, by way of example only, if a current operating level has a voltage of 0.5V, then an increase to 0.6V would constitute an increase to the next higher operating level (see description below).

In step 202, at an initial time point $t_i$, an initial operating level for the processor chip is set to a level such that the processor chip, when operated at the initial operating level, will have an actual power consumption that is as high as possible without exceeding a desired power consumption for the processor chip. The term "operating level," as used herein, generally refers to a particular combined voltage/frequency level at which the processor chip is being operated. For example, as will be described in detail below, the operating level of the processor chip may be changed (increased or decreased) throughout methodology 200. The operating level can be changed by changing the voltage and the frequency at which the processor chip is being operated, or alternatively, by changing just the frequency (with the voltage remaining fixed) at which the processor chip is being operated. It should be noted that the magnitude of the change to the actual power consumption will be greater when the change involves both the voltage and the frequency, as compared to changing only the frequency. However, methodology 200 operates the same regardless of which mode is employed to change the operating level of the processor chip.

Further, as highlighted above, the processor chip can be a single core processor chip or a multi-core processor chip. In the case where the processor chip is a single core processor chip, the operating level can be changed by varying both the voltage at which the processor chip is being operated and the frequency at which the single core is being operated, or by varying just the frequency (with the voltage remaining fixed) at which the single core is being operated. In the case where the processor chip is a multi-core processor chip, the operating level can be changed by varying both the voltage at which the processor chip is being operated and the frequency at which one or more of the cores is being operated, or by varying just the frequency (with the voltage remaining fixed) at which one or more of the cores is being operated. Power management relating to multi-core configurations is also described, for example, in R. Bergamaschi et al., "Exploring Power Management in Multi-Core Systems," *Proceedings of the 13th Asia and South Pacific Design Automation Conference (ASP-DAC 2008)*, Seoul Korea, (January 2008) (wherein overall chip performance, measured as total number of completed instructions by all cores per time period, is maximized for a given power budget), the disclosure of which is incorporated by reference herein.

The operating level can be set to meet the desired power consumption using a power management tool, such as Max-BIPS. The desired processor power consumption typically takes the form of a power budget that is established (e.g., by a system administrator) for operating the processor chip. A power budget is generally not a physical limit, but a power usage guideline, that if adhered to, can help control operating costs.

As described above, the operating levels are changed incrementally from one level to the next. Thus, in this step, an operating level is selected such that the processor chip operating at this operating level will have a power consumption that is closest to the desired power consumption, but does not exceed the desired power consumption. Another way to look at this is if one were to increase the operating level (from the initial operating level set in this step) to the next higher operating level, the processor chip power consumption would exceed the desired power consumption. This step can be achieved using a known power management tool(s), such as MaxBIPS in conjunction with DFS and/or DVFS power management actuators. As highlighted above, a magnitude of the difference between the desired power consumption and the actual power consumption at this stage can vary, depending on how close the desired power consumption is to the power the processor chip would consume at the next higher operating level.

In step 204, after a predetermined time interval, power consumption slack is calculated. According to the present teachings, power consumption slack (or slack for short) is calculated by taking a difference between the desired processor chip power consumption and an average of the actual processor chip power consumption from initial time point $t_i$. Simply stated, slack (which can be positive or negative) represents an amount by which the average actual processor chip power consumption falls short of the desired power consumption. Advantageously, according to the present teachings, the slack is cumulative. Namely, as will be described in detail below, according to methodology 200, the slack will be re-calculated at predetermined time intervals (as the difference between the desired processor chip power consumption and the average actual processor chip power consumption, see above). The re-calculated slack will, however, further include slack, if any, that has accumulated during one or more previous intervals, added thereto. Thus, step 204 is an initializing step wherein the slack is being calculated for the first time interval and there is zero accumulated slack.

In step 206, it is then determined whether the slack is greater than zero (i.e., when the desired power consumption is greater than the average actual power consumption) or less than zero (i.e., when the average actual power consumption is greater than the desired power consumption). If the slack is greater than zero, as a safety measure, a determination may also be made as to whether the actual power consumption of the processor chip is currently at a maximum level, as operating the processor chip above its power capacity can pose, e.g., thermal dangers. Thus, if the processor chip is already operating at its maximum power level, then the operating level remains at the initial operating level set in step 202. Otherwise, if the processor chip is not already operating at its maximum power level, then in step 208, the operating level is increased by the power management actuator(s) to the next higher level, thereby increasing the actual processor chip power consumption. In this step, the actual processor chip power consumption can temporarily exceed (overshoot) the desired processor chip power consumption. However, according to the present teachings, a counterpart drop in actual processor chip power consumption will also occur, such that over time an average of the actual processor chip power consumption will average out to the desired processor chip power consumption. On the other hand, if the slack is less than zero, then in step 210 the initial operating level (set in step 202, described above) is maintained.

Operating at a higher operating level provides the opportunity to also operate the processor chip at a correspondingly higher frequency, which increases processor chip performance (e.g., through increased throughput). For example, increases in processor chip performance of up to about 42 percent (%) have been achieved with the present techniques. Thus, if the operating level, above, is increased to the next higher operating level, then the frequency is also increased accordingly. According to an exemplary embodiment, performance is measured as the number of instructions executed per second.

After the same predetermined time interval, in step 212, the slack is re-calculated. The time interval used can be predetermined based, for example, on the rate of actuator adjustment supported by the hardware. As above, slack is calculated as the difference between the desired processor chip power consumption and the average of the actual processor chip power consumption (see, FIG. 3, described below). However, the re-calculated slack further includes excess slack, if any, that has accumulated during one or more previous intervals, added thereto, i.e., slack that has not been consumed by previous overshoots.

In step 214, it is then determined at this point whether or not the re-calculated slack is greater than zero. If the re-calculated slack is greater than zero, then in step 216 another determination is made as to whether the processor chip is already being operated at the next higher operating level. If the processor chip is not currently being operated at the next higher operating level (i.e., the processor chip is being operated at the initial operating level), then in step 218, the operating level is increased by the power management actuator(s) to the next higher level, thereby increasing the actual processor chip power consumption. As highlighted above, a determination may also be made as to whether the actual power consumption of the processor chip is currently at a maximum level before increasing the operating level. As highlighted above, an increase in operating level involves an increase in frequency, thereby increasing processor chip performance. However, if the processor chip is already being operated at the next higher operating level, then in step 220, the operating level is maintained.

On the other hand, if the re-calculated slack is less than zero, then in step 222 another determination is made as to whether the processor chip is already being operated at the next higher operating level. If the processor chip is not currently being operated at the next higher operating level (i.e., the processor chip is being operated at the initial operating level), then in step 224, the operating level (i.e., the initial operating level) is maintained. However, if the processor chip is currently being operated at the next higher operating level, then in step 226, the operating level is returned to the initial operating level by the power management actuator(s). Step 212 and the corresponding steps thereafter are then repeated at the given time interval.

By calculating and re-calculating the slack (at the given time interval) the present methodology is a self-tuning process. Namely, depending on the current power consumption at any given evaluation point, the operating level can be adjusted accordingly, as described above. One further advantage of the present techniques is that the positive slack is accumulated. By way of example only, when the processor chip is being operated at the initial operating level and the actual processor chip power consumption is, e.g., less than the desired processor chip power consumption, the available slack will accumulate. At the next time interval, the accumulated slack will allow the operating level to be increased to the next higher level, and will remain at the next higher operating level until the slack is exhausted (i.e., the slack equals zero or becomes negative).

Figure 3:
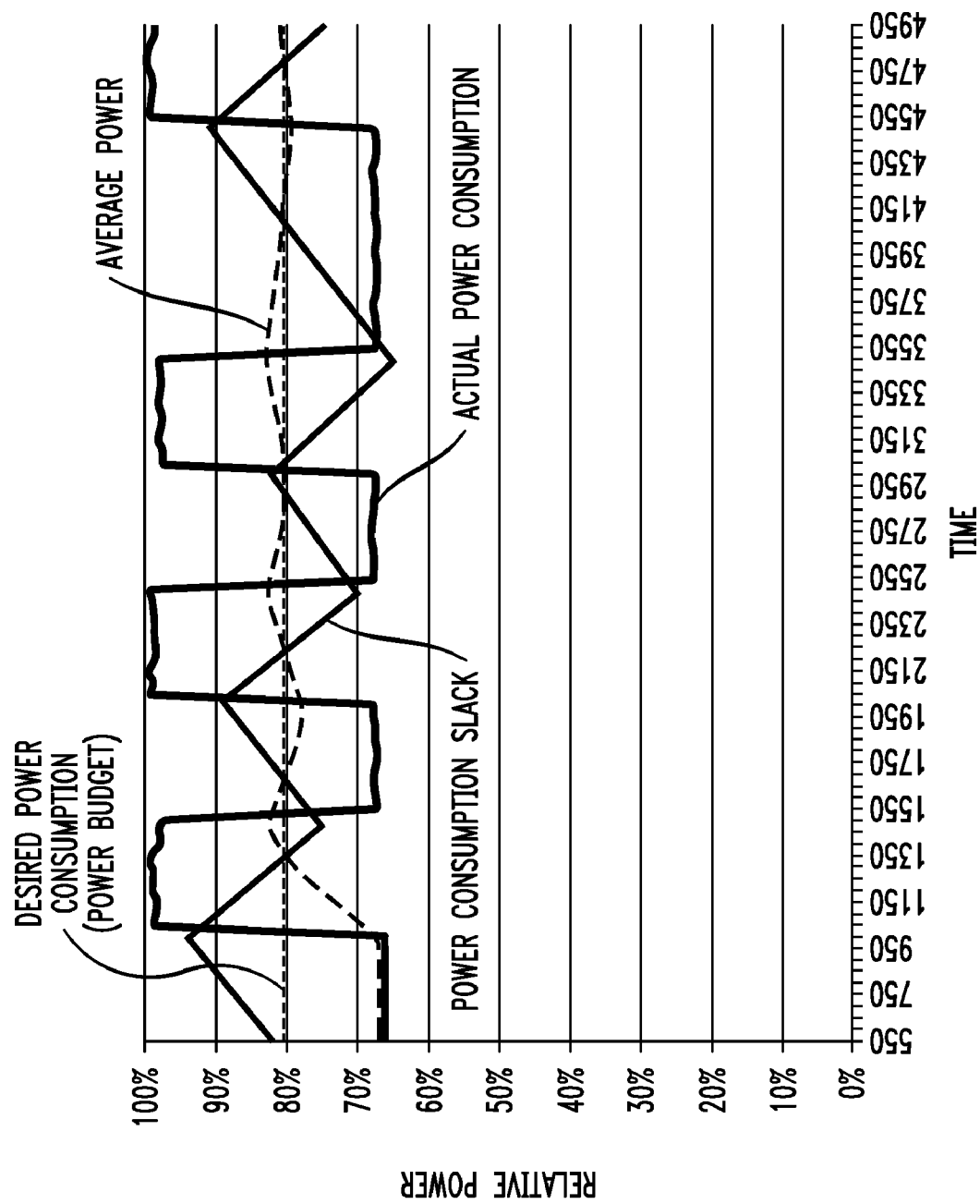
FIG. 3 is a graph illustrating an exemplary implementation of the methodology of FIG. 2 according to an embodiment of the present invention.

FIG. 3 is graph 300 illustrating an exemplary implementation of methodology 200 (described in conjunction with the description of FIG. 2, above). In graph 300, desired processor chip power consumption, actual processor chip power consumption, power consumption slack and average actual processor chip power consumption are presented as a function of time. In this embodiment, the desired processor chip power consumption is set at 80% of maximum available power. Beginning arbitrarily at time point 550, operation at an initial operating level places the actual processor chip power consumption below desired processor chip power consumption. At time point 1050, a calculation of the slack reveals that the slack is positive. As a result, the operating level is increased to the next higher operating level, thereby causing the actual power consumption to overshoot the desired power consumption for a limited amount of time. Namely after a given time interval, at time point 1550, re-calculation of the slack reveals that the slack is now negative. As a result, the operating level is returned to the initial operating level, thereby causing the actual processor chip power consumption to decrease back down below the desired processor chip power consumption. The process is repeated at time points 2050, 2550, 3050, 3550, etc (i.e., a regular time interval of 500 ticks). As a result, the average actual processor chip power consumption over time approximates the desired processor chip power consumption. It is notable that at time point 3550, a negative slack results in the operating level being returned to the initial operating level and the actual processor chip power consumption to dip back down below the desired processor chip power consumption. At time point 4050, the next evaluation time point, the slack is still negative. Therefore, the operating level is maintained at the initial operating level (until the next evaluation time point).

Figure 4:
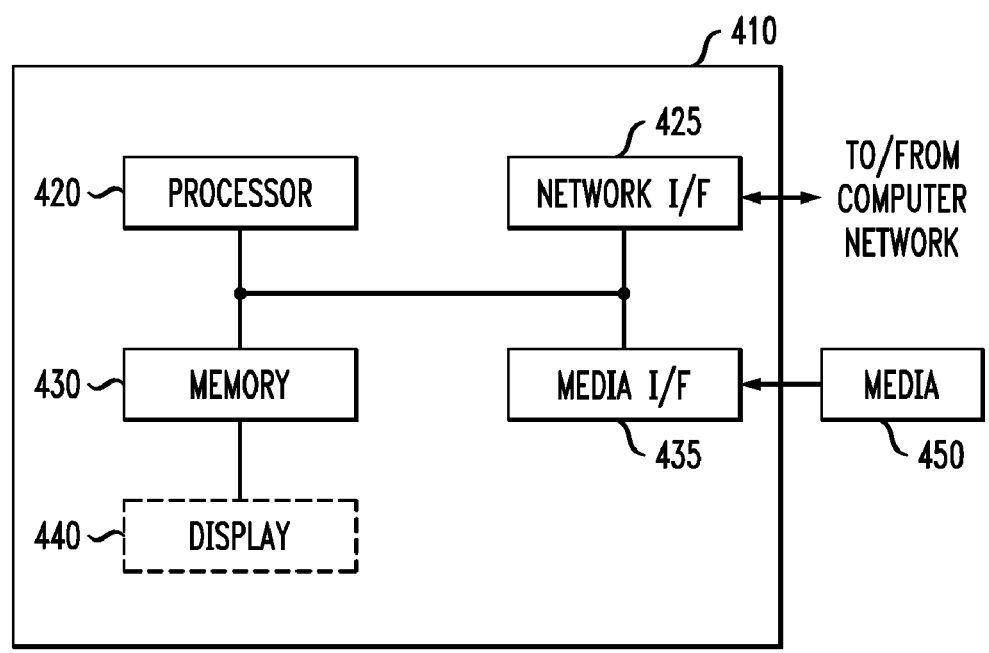
FIG. 4 is a diagram illustrating an exemplary apparatus for power management of a processor chip according to an embodiment of the present invention.

Turning now to FIG. 4, a block diagram is shown of an apparatus 400 for power management of a processor chip, in accordance with one embodiment of the present invention. The processor chip can be local or remote to apparatus 400. It should be understood that apparatus 400 represents one embodiment for implementing methodology 200 of FIG. 2.

Apparatus 400 comprises a computer system 410 and removable media 450. Computer system 410 comprises a local processor 420, a network interface 425, a memory 430, a media interface 435 and an optional display 440. Network interface 425 allows computer system 410 to connect to a network, while media interface 435 allows computer system 410 to interact with media, such as a hard drive or removable media 450.

As is known in the art, the methods and apparatus discussed herein may be distributed as an article of manufacture that itself comprises a machine-readable medium containing one or more programs which when executed implement embodiments of the present invention. For instance, the machine-readable medium may contain a program configured to set an initial operating level for the processor chip at an initial time point $t_i$ such that the processor chip, when operated at the initial operating level, will have an actual power consumption that is as high as possible without exceeding a desired power consumption for the processor chip; calculate power consumption slack after a predetermined time interval as a difference between the desired processor chip power consumption and an average of the actual processor chip power consumption from the time point $t_i$; if the slack is greater than zero, increase the initial operating level to a next higher level thereby increasing the actual processor chip power consumption, otherwise if the slack is less than zero, maintain the initial operating level; re-calculate the slack after the predetermined time interval, wherein the re-calculated slack further includes slack, if any, that has accumulated during one or more previous intervals added thereto; if the re-calculated slack is greater than zero, increase the operating level to the next higher level if the processor chip is being operated at the initial operating level, otherwise if the re-calculated slack is less than zero, return the operating level to the initial operating level if the processor chip is being operated at the next higher operating level; and repeat the steps to re-calculate the slack and either increase the operating level to the next higher level or return the operating level to the initial operating level.

As highlighted above, the operating level of the processor chip can be varied using one or more actuators. Thus, by way of example only, apparatus 400 can control one or more actuators (not shown) and by way thereof implement one or more of the steps of methodology 200.

The machine-readable medium may be a recordable medium (e.g., floppy disks, hard drive, optical disks such as removable media 450, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used.

Local processor 420 can be configured to implement the methods, steps, and functions disclosed herein. The memory 430 could be distributed or local and the local processor 420 could be distributed or singular. The memory 430 could be implemented as an electrical, magnetic or optical memory, or any combination of these or other types of storage devices. Moreover, the term "memory" should be construed broadly enough to encompass any information able to be read from, or written to, an address in the addressable space accessed by local processor 420. With this definition, information on a network, accessible through network interface 425, is still within memory 430 because the local processor 420 can retrieve the information from the network. It should be noted that each distributed processor that makes up local processor 420 generally contains its own addressable memory space. It should also be noted that some or all of computer system 410 can be incorporated into an application-specific or general-use integrated circuit.

Optional video display 440 is any type of video display suitable for interacting with a human user of apparatus 400. Generally, video display 440 is a computer monitor or other similar video display.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method for power management of a processor chip, comprising the steps of:
    setting an initial operating level for the processor chip at an initial time point $t_i$ such that the processor chip, when operated at the initial operating level, will have an actual power consumption that is as high as possible without exceeding a desired power consumption for the processor chip;
    calculating power consumption slack after a predetermined time interval as a difference between the desired processor chip power consumption and an average of the actual processor chip power consumption from the time point $t_i$;
    if the slack is greater than zero, increasing the initial operating level to a next higher level thereby increasing the actual processor chip power consumption, otherwise if the slack is less than zero, maintaining the initial operating level;
    re-calculating the slack after the predetermined time interval, wherein the re-calculated slack further includes slack, if any, that has accumulated during one or more previous intervals added thereto;
    if the re-calculated slack is greater than zero, increasing the operating level to the next higher level if the processor chip is being operated at the initial operating level, otherwise if the re-calculated slack is less than zero, returning the operating level to the initial operating level if the processor chip is being operated at the next higher operating level; and
    repeating the steps of re-calculating the slack and either increasing the operating level to the next higher level or returning the operating level to the initial operating level.

2. The method of claim 1, further comprising the step of:
    if the re-calculated slack is greater than zero, maintaining the operating level if the processor chip is already being operated at the next higher operating level.

3. The method of claim 1, further comprising the step of:
    if the re-calculated slack is less than zero, maintaining the operating level if the processor chip is already being operated at the initial operating level.

4. The method of claim 1, further comprising the step of:
    maintaining the initial operating level even if the slack is greater than zero, if the actual power consumption is at a maximum level.

5. The method of claim 1, further comprising the step of:
    repeating the step of re-calculating the slack and the step of either increasing the operating level to the next higher level or returning the operating level to the initial operating level which, over time, will result in the actual processor chip power consumption averaging out to the desired processor chip power consumption.

6. The method of claim 1, further comprising the step of:
    if the slack is greater than zero, increasing a frequency at which the processor chip is being operated, thereby increasing processor chip performance.

7. The method of claim 1, wherein the processor chip comprises a multi-core processor chip, the method further comprising the steps of:
    if the slack is greater than zero, increasing the operating level to the next higher operating level, thereby increasing the actual processor chip power consumption; and
    increasing a frequency at which one or more of the cores is currently being operated, thereby increasing processor chip performance.

8. An apparatus for power management of a remote processor chip, the apparatus comprising:
    a memory; and
    at least one local processor, coupled to the memory, operative to:
        set an initial operating level for the remote processor chip at an initial time point $t_i$ such that the remote processor chip, when operated at the initial operating level, will have an actual power consumption that is as high as possible without exceeding a desired power consumption for the remote processor chip;
        calculate power consumption slack after a predetermined time interval as a difference between the desired remote processor chip power consumption and an average of the actual remote processor chip power consumption from the time point $t_i$;
        if the slack is greater than zero, increase the initial operating level to a next higher level thereby increasing the actual remote processor chip power consumption, otherwise if the slack is less than zero, maintain the initial operating level;

re-calculate the slack after the predetermined time interval, wherein the re-calculated slack further includes slack, if any, that has accumulated during one or more previous intervals added thereto;

if the re-calculated slack is greater than zero, increase the operating level to the next higher level if the remote processor chip is being operated at the initial operating level, otherwise if the re-calculated slack is less than zero, return the operating level to the initial operating level if the remote processor chip is being operated at the next higher operating level; and repeat the steps to re-calculate the slack and either increase the operating level to the next higher level or return the operating level to the initial operating level.

9. The apparatus of claim 8, wherein the at least one local processor is further operative to:

if the re-calculated slack is greater than zero, maintain the operating level if the remote processor chip is already being operated at the next higher operating level.

10. The apparatus of claim 8, wherein the at least one local processor is further operative to:

if the re-calculated slack is less than zero, maintain the operating level if the remote processor chip is already being operated at the initial operating level.

11. The apparatus of claim 8, wherein the at least one local processor is further operative to:

maintain the initial operating level even if the slack is greater than zero, if the actual power consumption is at a maximum level.

12. An article of manufacture for power management of a processor chip, comprising a machine-readable recordable medium containing one or more programs which when executed implement the steps of:

setting an initial operating level for the processor chip at an initial time point $t_i$ such that the processor chip, when operated at the initial operating level, will have an actual power consumption that is as high as possible without exceeding a desired power consumption for the processor chip;

calculating power consumption slack after a predetermined time interval as a difference between the desired processor chip power consumption and an average of the actual processor chip power consumption from the time point $t_i$;

if the slack is greater than zero, increasing the initial operating level to a next higher level thereby increasing the actual processor chip power consumption, otherwise if the slack is less than zero, maintaining the initial operating level;

re-calculating the slack after the predetermined time interval, wherein the re-calculated slack further includes slack, if any, that has accumulated during one or more previous intervals added thereto;

if the re-calculated slack is greater than zero, increasing the operating level to the next higher level if the processor chip is being operated at the initial operating level, otherwise if the re-calculated slack is less than zero, returning the operating level to the initial operating level if the processor chip is being operated at the next higher operating level; and repeating the steps of re-calculating the slack and either increasing the operating level to the next higher level or returning the operating level to the initial operating level.

13. The article of manufacture of claim 12, wherein the one or more programs which when executed further implement the step of:

if the re-calculated slack is greater than zero, maintaining the operating level if the processor chip is already being operated at the next higher operating level.

14. The article of manufacture of claim 12, wherein the one or more programs which when executed further implement the step of:

if the re-calculated slack is less than zero, maintaining the operating level if the processor chip is already being operated at the initial operating level.

15. The article of manufacture of claim 12, wherein the one or more programs which when executed further implement the step of:

maintaining the initial operating level even if the slack is greater than zero, if the actual power consumption is at a maximum level.

* * * * *